United States Patent
Hogan

(10) Patent No.: US 6,501,721 B2
(45) Date of Patent: *Dec. 31, 2002

(54) SPLICELESS EDITING OF A READ/WRITE OPTICAL MEDIUM

(75) Inventor: Joshua N. Hogan, Los Altos, CA (US)

(73) Assignee: Hewlett-Packard Company, Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/231,045

(22) Filed: Jan. 14, 1999

(65) Prior Publication Data

US 2002/0126595 A1 Sep. 12, 2002

(51) Int. Cl.[7] .................................. G11B 7/00
(52) U.S. Cl. ..................... 369/83; 369/59.24; 369/47.13
(58) Field of Search .............................. 369/83, 84, 116, 369/59.23, 59.24, 59.26, 53.24, 53.2, 47.13

(56) References Cited

U.S. PATENT DOCUMENTS

| 5,343,455 A | | 8/1994 | Takeuchi ..................... 369/59 |
| 5,995,470 A | * | 11/1999 | Tsubaki et al. ................ 369/83 |
| 6,046,969 A | * | 4/2000 | Towner et al. ........... 369/47.31 |

FOREIGN PATENT DOCUMENTS

| EP | 0881641 A2 | 1/1998 |
| EP | 0825602 A2 | 2/1998 |
| EP | 0872830 A1 | 10/1998 |

* cited by examiner

Primary Examiner—Thang V. Tran

(57) ABSTRACT

An optical read/write drive such as a DVD+RW drive writes a block of new data to a read/write medium by locating an edit bit in the block of data that has already been written to the medium, and writing the block of new data to the medium, beginning or ending at the edit bit. The edit bit may be chosen to avoid errors arising from polarity conflicts between data already written to the disc and the new data. The edit bit could be, for example, a differing transition bit in a sync codeword of a modulation-encoded block.

20 Claims, 5 Drawing Sheets

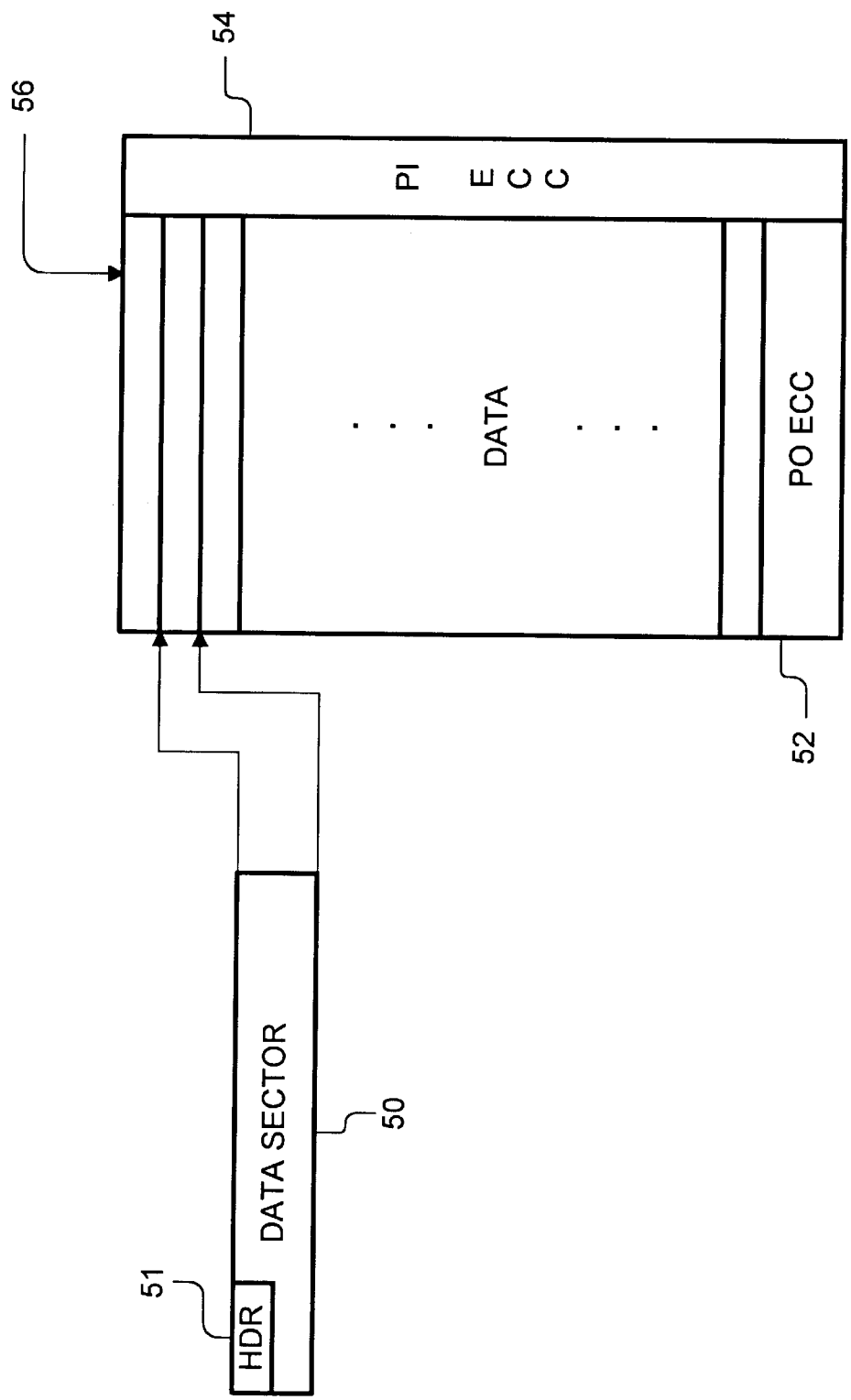

FIGURE 7
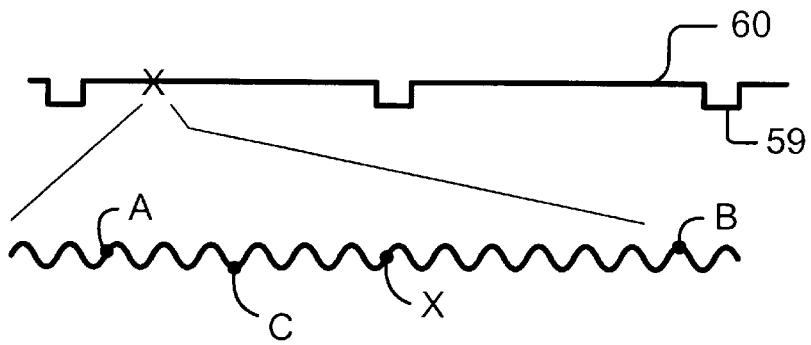
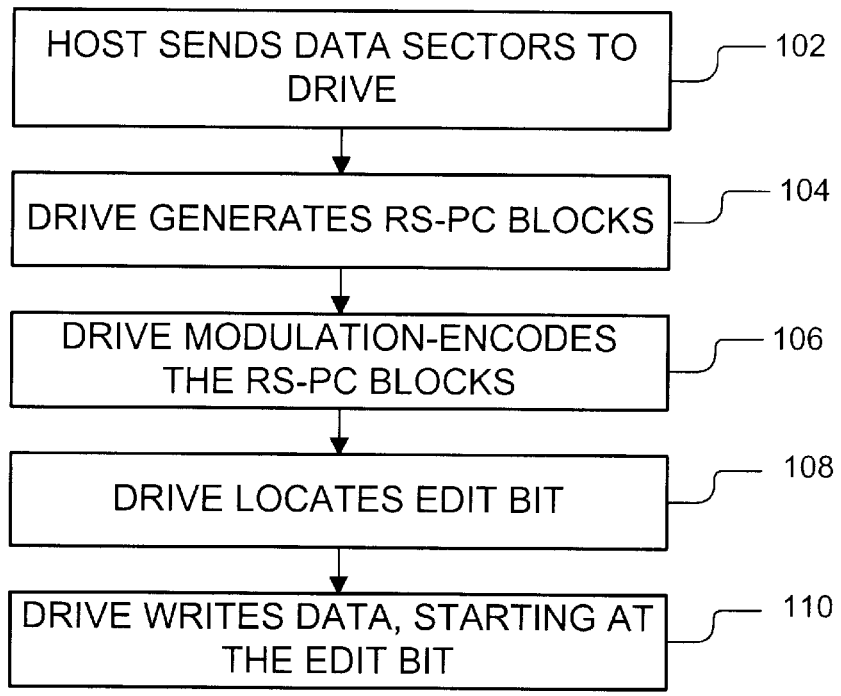
FIGURE 8

SPLICELESS EDITING OF A READ/WRITE OPTICAL MEDIUM

BACKGROUND OF THE INVENTION

The invention relates to optical data storage. More specifically, the invention relates to a method for writing data to an optical storage medium such as a DVD or a CD. "Read/write" optical discs include optical discs that allow new data to be written only once and optical discs that allow new data to be written many times. A DVD+RW disc is an example of a read/write disc that allows new data to be written many times. "Read/write" drives can write data to "read/write" optical discs. A read/write drive typically has a read mode of operation and at least one of the following write modes of operation: a write-append mode and an insert-edit mode. The write-append mode allows new data to be appended to previously written data on the read/write disc, and the insert-edit mode allows previously written data to be overwritten with new data.

When writing new data to a read/write disc, it is desirable not to create a frequency or phase discontinuity between the previously written data and the new data. The read/write drive might not be able to tolerate such discontinuities during read back of the previously written data and the new data. During readback, the discontinuities might cause problems for clocks and data recovery circuitry. Consequently, the discontinuities might render portions of the read/write disc effectively unreadable by the read/write drive.

The problems resulting from these discontinuities may be overcome by the use of "edit gaps" (also known as "splice areas" and "buffer zones"). The edit gaps separate the previously written data and the new data. A frequency or phase discontinuity might arise from an edit gap following a block of the previously written data. During readback of the previously written data and then the edit gap, the clocks and data recovery circuitry might become unstable. However, the edit gap allows sufficient time for the clocks and data recovery circuitry to recover before the newly written data is read back.

However, the use of edit gaps has its drawbacks. Storage capacity of the read/write disc is reduced because data is not stored in the edit gaps.

Moreover, the edit gaps might render portions of the read/write disc unreadable by existing read-only drives. Older read-only drives that were developed prior to newer generation read/write drives might not be capable of processing the edit gaps. Unless an existing read-only drive is somehow modified to navigate past the edit gaps, it will have difficulty reading the data stored on the read/write disc.

There is a need for a read/write drive that does not rely upon edit gaps to overcome the problem arising from discontinuities between previously written data and newly written data.

SUMMARY OF THE INVENTION

This need is met by the present invention, which may be regarded as a method of writing a block including new data to a read/write medium. The method includes locating an edit bit in a block that has already been written to the medium, and writing the new block to the disc, beginning or ending at the edit bit.

Other aspects and advantages of the present invention will become apparent from the following detailed description, taken in conjunction with the accompanying drawings, illustrating by way of example the principles of the invention.

BRIEF DESCRIPTION OF THE DRAWINGS

FIG. 4 is an illustration of an RS-PC block;

FIG. 7 is an illustration of a large random shift caused by an edit bit, the shift covering several wobble cycles; and FIG. 8 is a method of writing new data to the disc in accordance with the present invention.

DETAILED DESCRIPTION OF THE INVENTION

Figure 2:
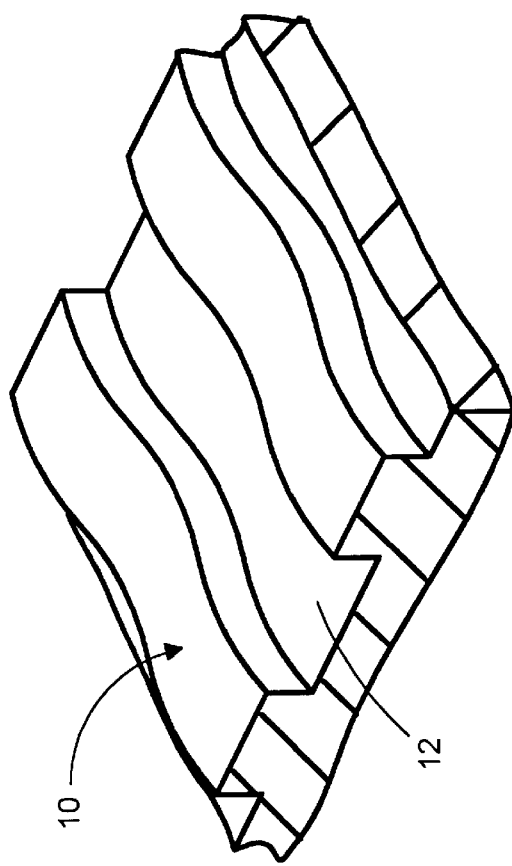
FIG. 2 is an illustration of a cross-section of the read/write disc.

As shown in the drawings for purposes of illustration, the present invention is described in connection with an optical read/write drive, which can write new data to a read/write optical disc with bit-accuracy without causing phase and frequency discontinuities. Before writing new data to the disc, the bit-accurate read/write drive locates a specific bit in a data block already written to the disc. The drive then starts writing the data, starting or ending at that specific bit. The specific bit, hereinafter referred to as an "edit" bit, may be chosen to avoid errors arising from polarity conflicts between data already written to the disc ("old data") and the newly written data ("new data"). Consequently, the bit-accurate read/write drive can write new data to an optical disc without the use of edit gaps.

In the paragraphs that follow, the read/write drive will be described as a bit-accurate DVD read/write drive and the read/write optical disc will be described as a DVD read/write disc. First, a description of the DVD read/write disc will be provided. Next a description of the DVD read/write drive will be provided. Then a method of writing to the disc will be described.

Figure 1:
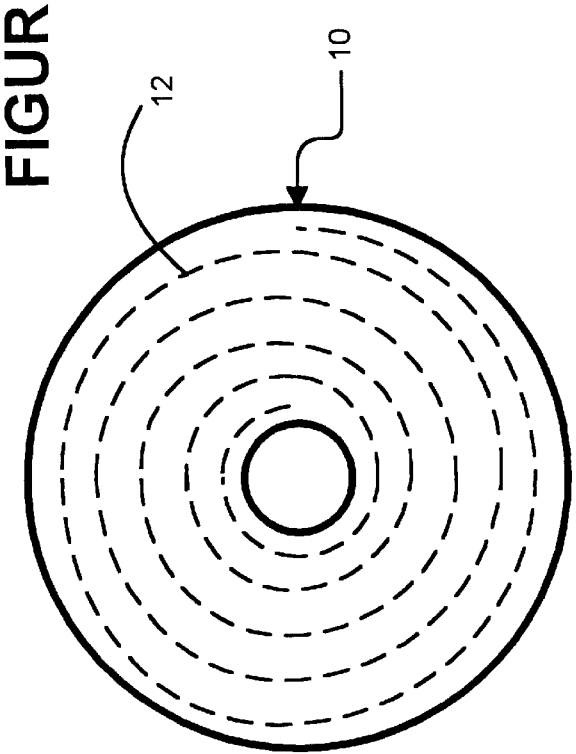
FIG. 1 is an illustration of a DVD read/write disc.

FIGS. 1 and 2 show a phase-change DVD disc 10, hereinafter referred to as the disc 10. The disc 10 typically includes a rigid substrate that is coated with a recordable medium. The recordable medium may be made of a read/write material such as a phase change material. A spiral groove 12 is embedded in the disc 10. A laser beam can be used to heat and cool the recordable medium quickly to form marks having an amorphous state. The laser beam can also be used to erase the marks from the recordable medium by annealing the marks into a crystalline state. Data is represented by patterns of marks on the disc 10.

The spiral groove 12 has a high frequency wobble. The high frequency wobble, which gives the spiral groove 12 a slight sinusoidal wave, may be used to modulate the laser beam. A bit-accurate drive, in turn, may generate a precise high frequency timing signal from such a modulated laser beam. Low frequency addressing information may also be imposed on the wobble (for example, by eliminating single wobble cycles in a pattern that conveys addressing information). The combination of the high frequency timing signal and the addressing information allows the bit-accurate drive to locate specific bits on the disc 10.

It is understood that FIG. 1 merely provides an illustration to facilitate an understanding of the invention; it is not intended to show the disc 10 in detail or proper scale. For instance, pitch of the spiral, the thickness of the groove 12, the frequency of the wobble, etc., are not illustrated to scale.

Figure 3:
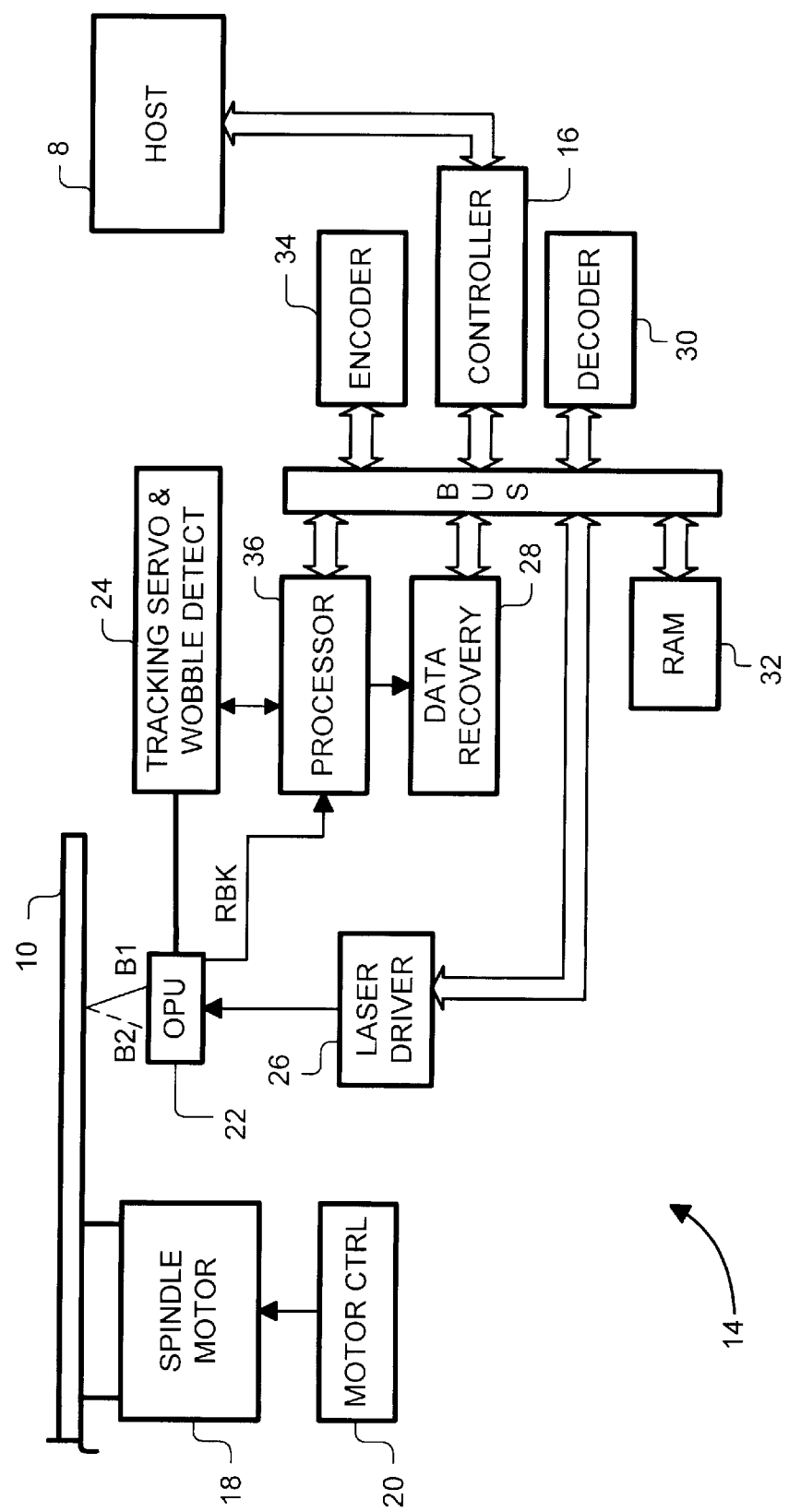
FIG. 3 is an illustration of a read/write drive according to the present invention.

FIG. 3 shows the disc 10 and a bit-accurate DVD read/write drive 14 that follows a DVD format specification such as the DVD+RW format specification. The drive 14 includes a controller 16 for receiving a mode of operation from a host 8 (e.g., a personal computer). The modes of operation include a read mode and may include various write modes such as a write-append mode and an insert-edit mode.

The drive 14 further includes a spindle motor 18 and motor control 20 for rotating the disc 10. The DVD drive 14 further includes an optical pickup unit 22, which typically includes a laser for generating a laser beam B1; and means (e.g., an optics assembly and photodetector array) for detecting a modulated beam B2. The optical pickup unit 22 generates an electrical signal RBK carrying data and timing/addressing information.

The laser of the optical pickup unit 22 is driven by a laser driver 26. Power of the laser beam B1 depends upon the mode of operation of the drive 14. The laser power is controlled between various levels including a read level for reading data from the disc 10, an erase level for erasing data on the disc 10, and a write level for writing data to the disc 10. A processor 36 receives the electrical signal from the optical pickup unit 22.

A tracking servo and wobble detection system 24 receives the electrical signal RBK from the processor 36. The tracking and wobble detection system 24 processes the electrical signal RBK to obtain addressing information and a precise high frequency timing signal. The addressing information and timing signal are supplied to the processor 36, which uses the addressing information and timing signal to control the timing of the laser driver 26 and to locate specific bits on the disc 10. Under command of the controller 16, the tracking servo and wobble detection system 24 also moves the optical pickup unit 22 along the disc 10.

A bit-accurate drive derives timing accuracy from a high frequency reference signal. The bit-accurate drive also has the ability to unambiguously identify particular cycles in the reference signal. Generation of the high frequency signal using wobble of the spiral groove in the disc 10 is disclosed in Towner et al. U.S. Ser. No. 08/899,427,which was filed on Jul. 24, 1997 and assigned to the assignee of the present invention. The specification of U.S. Ser. No. 08/899,427 is incorporated herein by reference.

An example of how particular cycles of the reference signal are unambiguously identified is as follows. The reference signal cycles could be unambiguously identified by a systematic arrangement of missing wobble cycles, aligned with data sectors (e.g., in sync codewords). The ability to identify particular patterns of missing wobble cycles allows data sector addresses to be located. Data is written synchronously with the wobble. The combination of the high frequency reference signal and the address information derived from the missing wobbles allows data within data sectors to be identified. Moreover, the combination allows new data to be written to the disc without discontinuities in phase and frequency.

A conventional data recovery circuit 28 also receives the electrical signal RBK from the processor 36 and recovers data from the electrical signal RBK. A decoder 30 demodulates the recovered data, arranges the demodulated data in error correction code ("ECC") blocks in RAM 32, and performs error correction on the ECC blocks. The error-corrected data is sent to the host 8.

Additional reference is now made to FIG. 4. The host 8 typically initiates an insert-edit operation by sending new data to the drive 14 in one or more two kilobyte (that is, "2K") sectors 50 (along with associated addressing information). Each 2K sector 50 includes a header 51, which contains address information.

Under control of the controller 16, the 2K sectors 50 are buffered in the RAM 32 and arranged into 32K blocks. An encoder 34 performs ECC encoding on each 32K block of user data. Reed-Solomon Product Code ("RS-PC") encoding is typically used in CD and DVD drives. Rows 52 and columns 54 of RS-PC codewords (i.e., redundancy data) are appended to the user data. In the alternative, the redundancy data may be interleaved with the user data. Resulting is an RS-PC block 56 that is typically 208 lines long and 182 bytes wide.

The RS-PC blocks 56 are then modulation encoded by the encoder 34. A typical modulation code is a 2:10 Run Length Limited code. During typical modulation encoding according to a DVD format, the eight bit bytes of the RS-PC blocks 56 are replaced with 16-bit symbol codewords.

Figure 5:
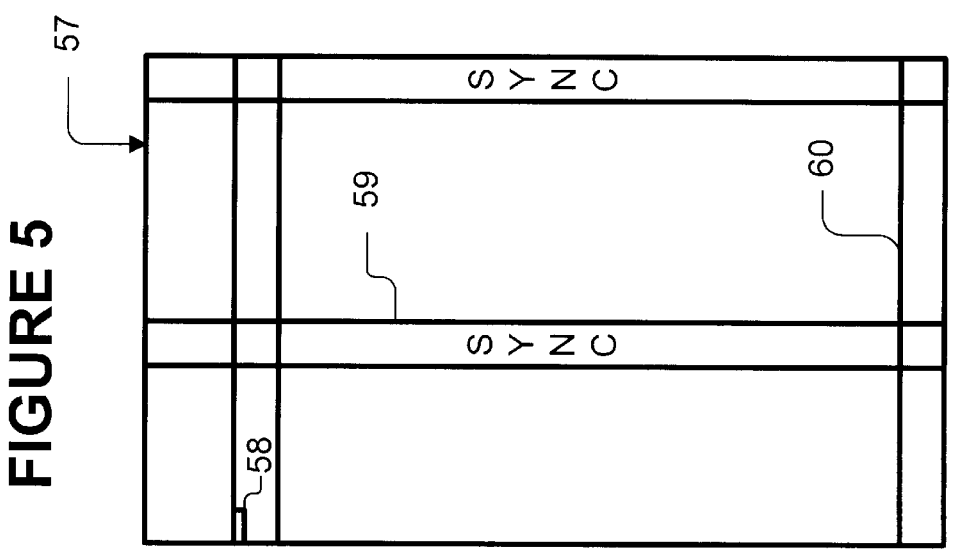
FIG. 5 is an illustration of a modulation-encoded block.

FIG. 5 shows a modulation-encoded block 57. In addition to symbol codewords, the modulation-encoded block 57 includes sync codewords 59. The modulation-encoded header 58 of each modulation-encoded sector includes an address, address error detection and reserved symbol codewords. Each sync codeword 59 has a length of 32 bits. A sync codeword 59 is typically inserted after every 91 symbol codewords.

Figure 6:
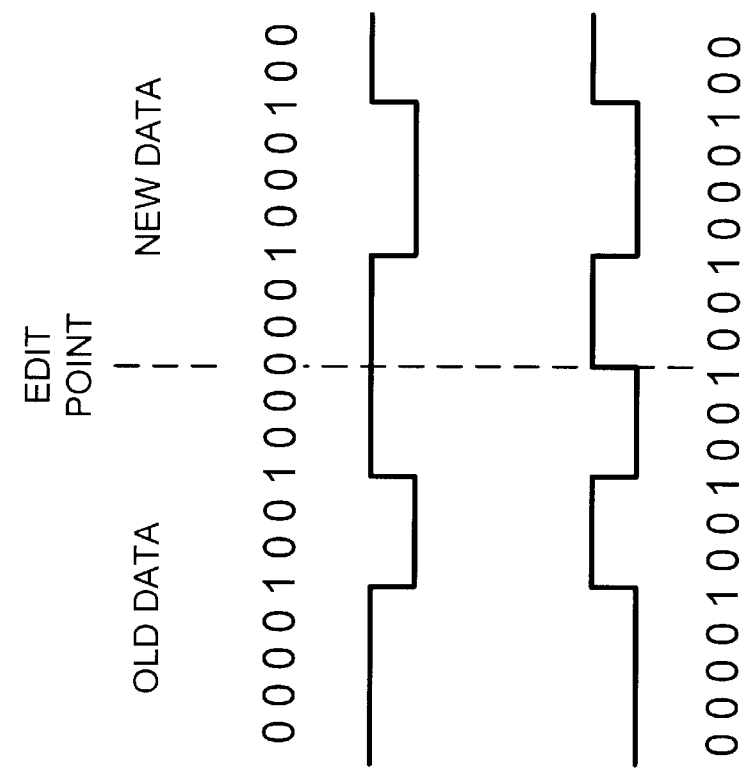
FIG. 6 is an illustration of different possible representations of an encoded sequence on the disc.

Information is encoded as changes in polarity. Polarity refers to the high/low reflectivity characteristic of the disc 10. The polarity itself does not carry information, only the changes or transitions in polarity carry information. Thus, if the bit sequence "100" is old data, and the bit sequence "1001" is appended to the old data, either a "1001001" or a "1000001" will be read back, depending upon relative polarity of the old and new data (see FIG. 6). If a new modulation-encoded block is appended to an old block, but the new block has an incompatible polarity at the edit point, a polarity conflict at the edit point will occur. As a result of the polarity conflict, an edge (i.e., transition) will be erroneously inserted into the modulation-encoded data. The unwanted edge will cause an error in the data.

Reference is once again made to FIG. 3. Before the modulation-encoded blocks 57 are written to the disc 10, the drive 14 uses the combination of the addressing information and the timing signal to locate an edit bit on the disc 10. The edit bit, described below in greater detail, is a specific bit at which the drive 14 begins or finishes a write operation.

When the edit bit is located, the controller 16 has the modulation-encoded data sent to the laser driver 26, and commands the laser driver 26 to begin writing the data to the disc 10 (e.g., the controller 16 enables a write clock generator to send a write clock to the laser driver 26), starting at the edit bit. Timing of the laser driver 26 is controlled by the processor 36. The laser driver 26 causes the laser in an optical pickup unit 22 to write the data to the disc 10, starting at the edit bit.

The edit bit will now be described in greater detail. One possible location for the edit bit is a sync codeword. Certain sync codewords are available in pairs, which differ by only one transition bit. This differing transition bit may be used as the edit bit. Exemplary sync codeword pairs for states 1 and 2 are as follows, with the double-underlined bit indicating the edit bit.

```
              MSB                                   LSB
SY0 (primary)=   0001001001000100 0000000000010001
SY0 (secondary)= 0001001000000100 0000000000010001
```

Exemplary sync codeword pairs for states 3 and 4 are as follows, with the double-underlined bit indicating the differing transition bit.

```
              MSB                                   LSB
SY0 (primary)=   1001001000000100 0000000000010001
SY0 (secondary)= 1001001001000100 0000000000010001
```

If the drive 14 starts writing at the edit bit in the sync codeword, it does not matter which polarity is used at the edit point: the sync codeword will still be valid. Thus, by starting or stopping the write operation at the differing transition bit in the sync codeword, error caused by the polarity conflict will be avoided.

The edit bit is not limited to the differing transition bit in a sync codeword. The edit bit may instead be a bit in a portion of a sync codeword in which polarity of the portion is known. For example, the sync codeword SY0 includes a string of thirteen zeroes. By a previously agreed-upon convention, that string of thirteen zeroes would be required to have a specific polarity. Consequently, writing would start or stop at any of those thirteen zeroes in the string, using the agreed-upon polarity.

The edit bit could be a bit in a codeword other than a sync codeword. Codeword pairs that differ by a bit may be designed for the reserved area of the header 58. This differing bit may be used as the edit bit. By making the edit at a bit in the reserved area of the header 58, the edit bit will follow the address information. In the event of an incorrect edit, the address information would not be affected.

Reference is now made to FIG. 7. In the case of a read/write drive that does not have sufficient accuracy to edit a bit without creating phase and frequency discontinuities (i.e., a drive that is not bit-accurate because, for example, its timing signal is not sufficiently accurate), edits may still be made without splicing edit gaps between blocks of old and new data. There might be errors in the data that is read back. However, the errors may be corrected by an error correction scheme. In such circumstances the edit bit Z may be located in the last line 60 of the last block 57 of old data. Such an edit bit Z will typically create a discontinuity that causes the last line 60 to be in error. However, the impact of the discontinuity may be minimized by locating the edit bit Z towards the beginning of the last line 60 and will encounter at least one sync codeword 59 to allow for bit identification. During readback, the circuitry will still have sufficient time to recover from instabilities caused by the discontinuities before encountering the new block of data. The last line 60 after the edit bit Z could be filled with filler data that facilitates recovery (e.g., a periodic patter, a pattern that sets dc content of the timing signal to a different level).

Thus, beginning an edit in the last line of a modulation-encoded block of old data presents an opportunity for a drive to perform spliceless editing, even though the drive does not have bit-accuracy. Beginning an edit in the last line also presents an opportunity to intentionally introduce a large random phase discontinuity in the last line. A large random phase discontinuity would be caused by beginning an edit at shifted edit bits A, B or C instead of the unshifted edit bit Z. The large random phase discontinuity may be introduced to overcome media-wear problems that occur with multiple overwrites to the disc 10 (multiple overwrites of the same data at the same location can cause the disc 10 to degrade at that location). The large random phase discontinuity between unshifted and shifted edit bits (e.g., the discontinuity between bits Z and C cover several wobble cycles). During readback, there is sufficient time to re-synchronize the read clocks and resolve any dc offset issues. Since at least one sync codeword will be encountered before the new block of data is read, bit-accurate timing can be achieved. Re-synchronization may further be facilitated by the use of known filler codewords.

FIG. 8 shows a general method of writing new data to a read/write disc. The host sends the one or more data sectors to the drive (block 102). The drive assembles the data sectors into 32K blocks, generates one or more RS-PC blocks (block 104), and modulation-encodes the RS-PC blocks (block 106). The drive then locates an edit bit on the disc (block 108) and begins writing the modulation-encoded blocks to the disc, starting at the edit bit (block 100). In this manner, the new data is written to the disc.

Thus disclosed is a bit-accurate drive that can edit data on an optical read/write medium without the use of edit gaps. Starting or stopping a write operation at an appropriately selected bit avoids introducing any additional data due to polarity incompatibilities between old and new data. Starting or stopping the write operation at a differing transition bit in a sync codeword avoids any errors that might arise from polarity conflicts.

The invention is not limited to the specific embodiment described and illustrated above. The editing could end at an edit bit instead of starting at the edit bit. For example, an edit-insert operation could be performed in which the drive start writing data at the beginning of the disc 10 and ending at an edit bit on the disk. Therefore, the invention is construed according to the claims that follow.

What is claimed is:

1. A method of writing a first block including new date to a read/write optical medium, a second block including old data having already been written to the medium, the second block including a sync codeword, the sync codeword having a differing transition bit, the method comprising:

locating an edit bit in the second block by locating the differing transition bit; and writing the first block to the disc, one of beginning and ending of the writing occurring at the edit bit;

whereby at least a portion of the second block is overwritten.

2. A method of writing a first block including new data to a read/write optical medium, a second block including old data having already been written to the medium, the second block including a sync codeword, a portion of the sync codeword having a predetermined polarity, the method comprising:

locating an edit bit in the second block by locating a bit in the portion having the predetermined polarity; and writing the first block to the disc, one of beginning and ending of the writing occurring at the edit bit;

whereby at least a portion of the second block is overwritten.

3. A method of writing a first block including new data to a read/write optical medium, a second block including old data having already been written to the medium, the second block including a header, the header having a reserved area, a codeword having a differing bit being stored in the reserved area, the method comprising:

locating an edit bit in the second block by locating the differing bit of the codeword; and writing the first block to the disc, one of beginning and ending of the writing occurring at the edit bit;

whereby at least a portion of the second block is overwritten.

4. A method of writing a first block including new data to a read/write optical medium, a second block including old data having already been written to the medium, the second block having a last line providing error correction capability, the method comprising:

locating an edit bit in the second block by locating a bit in the last line of the block; and writing the first block to the disc, one of beginning and ending of the writing occurring at the edit bit, whereby at least a portion of the second block is overwritten and at least some of the error correction capability is lost.

5. The method of claim 4, wherein at least some of the last line is filled with data that allows for data recovery clock stabilization.

6. The method of claim 4, wherein the edit bit is located to introduce a large random phase discontinuity in the last line.

7. A method of writing a first block including new data to a read/write optical medium, a second block including old data having already been written to the medium, the method comprising:

generating a high frequency reference signal and addressing information from the optical medium;

locating an edit bit in the second block by using the high frequency reference signal and addressing information;

writing the first block to the optical medium, one of beginning and ending of the writing occurring at the edit bit;

whereby at least a portion of the second block is overwritten.

8. Apparatus for writing data to a read/write optical disc, the apparatus comprising:

a laser;

means, responsive to a reflected output of the laser, for generating a high frequency reference signal and addressing information; and means for locating an edit bit on the disc by using the high frequency reference signal and addressing information.

9. Apparatus for writing data to a read/write optical disc, the apparatus comprising:

a laser; and means, responsive to a reflected output of the laser, for locating an edit bit on the disc by locating a differing transition bit of a sync codeword on the disc.

10. Apparatus for writing data to a read/write optical disc, the apparatus comprising:

a laser; and means, responsive to a reflected output of the laser, for locating an edit bit on the disc by locating a bit within a portion of a sync codeword on the disc, the portion having a predetermined polarity.

11. Apparatus for writing data to a read/write optical disc, the apparatus comprising:

a laser; and means, responsive to a reflected output of the laser, for locating an edit bit on the disc, wherein a block including a header is already stored on the disc, the header having a reserved area, and wherein the means locates the edit bit by locating a differing bit of a codeword that is stored in the reserved area of the header.

12. Apparatus for writing data to a read/write optical disc, the apparatus comprising:

a laser; and means, responsive to a reflected output of the laser, for locating an edit bit on the disc, wherein a block of old data is already stored on the disc, a last line of the block providing error correction capability, wherein the means is configured to locate the edit bit in the last line of the block.

13. The apparatus of claim 12, wherein the means fills at least some of the last line with data that allows for data recovery clock stabilization.

14. The apparatus of claim 12, wherein the edit bit is located to introduce a large random phase discontinuity in the last line.

15. A read/write optical drive comprising:

a laser driver;

a reference signal generator;

a data sector address detector;

means, responsive to outputs of the generator and the address detector, for locating a disc edit bit and commanding the laser driver to begin a write operation at the edit bit.

16. The drive of claim 15, wherein the edit bit is a differing bit of a codeword.

17. The drive of claim 15, wherein the edit bit is a bit within a portion of a sync codeword, the portion having a predetermined polarity, the laser being caused to begin the write operation using the predetermined polarity.

18. The drive of claim 15, wherein the edit bit is a bit in a last line of a modulation-encoded block, the last line providing error correction capability.

19. The drive of claim 18, wherein at least some of the last line is filled with data that allows for data recovery clock stabilization.

20. The drive of claim 18, wherein the edit bit is located to introduce a large random phase discontinuity in the last line.

* * * * *